United States Patent
Miyazaki et al.

[11] Patent Number: 6,125,012
[45] Date of Patent: Sep. 26, 2000

[54] RECORDING MEDIUM CARTRIDGE WITH A TWIN-COILED TORSIONAL SPRING-BIASED SHUTTER

[75] Inventors: Nobutaka Miyazaki, Kusatsu; Takashi Sumida, Shiga-ken, both of Japan

[73] Assignee: Hitachi Maxell, Ltd., Osaka-fu, Japan

[21] Appl. No.: 09/270,056

[22] Filed: Mar. 16, 1999

[30] Foreign Application Priority Data

Mar. 16, 1998 [JP] Japan .................................. 10-088147
Mar. 4, 1999 [JP] Japan .................................. 11-057598

[51] Int. Cl.[7] .......................... G11B 23/03; G11B 23/027
[52] U.S. Cl. ......................... 360/133; 360/132; 369/291; 242/347.1
[58] Field of Search .................................. 360/132, 133; 369/291; 242/347.1

[56] References Cited

U.S. PATENT DOCUMENTS

| | | | |
|---|---|---|---|
| 3,759,465 | 9/1973 | Janssen et al. | 242/347.1 |
| 4,045,821 | 8/1977 | Fujikura | 360/132 |
| 4,620,254 | 10/1986 | Smith, II | 360/132 |
| 4,945,530 | 7/1990 | Sandell et al. | 369/291 |
| 5,257,153 | 10/1993 | Sakurada | 360/133 |

FOREIGN PATENT DOCUMENTS

| | | |
|---|---|---|
| 0271997A2 | 6/1988 | European Pat. Off. . |
| 0406943A1 | 1/1991 | European Pat. Off. . |
| 0537714A2 | 4/1993 | European Pat. Off. . |
| 0589443A2 | 3/1994 | European Pat. Off. . |
| 601685 | 1/1985 | Japan . |
| 8-63940 | 3/1996 | Japan . |
| 9245458 | 9/1997 | Japan . |
| 1064222 | 3/1998 | Japan . |

*Primary Examiner*—Jefferson Evans
*Attorney, Agent, or Firm*—Birch, Stewart, Kolasch & Birch

[57] ABSTRACT

A cartridge includes a housing having a medium chamber defined therein for accommodating the recording medium and also having at least one access opening defined therein, a slide shutter slidably mounted on the housing for movement between an opened position in which the access opening is opened and a closed position in which the access opening is closed, and a biasing member for biasing the slide shutter towards the closed position. The biasing member is in the form of a twin-coiled torsional spring including first and second coils connected together by means of a bridge and first and second spring arms extending outwardly from the first and second coils, respectively. The first spring arms has a free end engaged to the slide shutter and the second spring arm has a free end engaged to a portion of the housing.

7 Claims, 8 Drawing Sheets

RECORDING MEDIUM CARTRIDGE WITH A TWIN-COILED TORSIONAL SPRING-BIASED SHUTTER

BACKGROUND OF THE INVENTION

1. Field of the Invention

The present invention relates to a cartridge accommodating therein an information carrier medium which may be a length of magnetic recording tape, a magnetic recording disc, an optical disc or a magneto-optical disc.

2. Description of the Prior Art

The cartridge for accommodating the information carrier medium is currently available in various types. Of those types, the present invention pertains to a single-reel tape cartridge generally used in association with a computer for data back-up purposes, a compact two-reel tape cartridge generally known as a DAT (digital audio tape) cartridge, and a disc cartridge. In any event, the present invention is applicable to any type of cartridge having a spring-biased slide shutter.

As is well known to those skilled in the art, the single-reel tape cartridge comprises a generally rectangular box-like housing having top and bottom panels and a peripheral wall Including front, rear and side walls and joining the top and bottom panels together with a tape chamber defined therein. The front wall has an access opening defined therein, through which a length of magnetic recording tape wound around a single reel within the tape chamber is selectively drawn outwardly and retracted into the housing. The access opening is normally closed by a shutter carried by the housing.

In this single-reel tape cartridge, the Japanese Laid-open Patent Publication No. 8-43940 discloses the shutter that is pivotally supported and is normally biased by a single-coiled torsional spring towards a closed position in which the access opening is closed. Although any possible ingress of dusts into the tape chamber is effectively and advantageously avoided, the pivotally supported shutter poses a problem in that when the shutter is opened against the biasing force of the torsional spring, the shutter protrudes a considerable distance outwardly of the housing, particularly outwardly from the front wall of the housing. Considering that opening of the shutter is mainly required when the tape cartridge is loaded in a tape drive, the freedom of disposition of a tape loading mechanism and a tape transport mechanism in the tape drive is limited and a relatively large space has to be secured within the tape drive to accommodate the shutter then in the opened position. This not only restricts the freedom of design, but also hampers downsizing and simplification of the tape drive and increase of the tape transport speed.

In an attempt to simplify the structure of and improve the function of the tape drive, the inventors of the present invention have examined the possible use of a slide shutter supported for sliding motion between opened and closed positions along the front wall of the cartridge housing. In principle, the slide shutter can make use of a support structure similar to that used in connection with a protect notch that is used in the standard tape cartridge for avoiding an inadvertent erasure of information recorded on the length of magnetic tape.

However, in the case of the single-reel tape cartridge, a free end of the length of magnetic tape wound around the single reel has to be retained at a predetermined location inwardly of the housing and adjacent the access opening together with a retainer pin around which the free end of the magnetic tape is secured. Accordingly, when the slide shutter is applied to the single-reel tape cartridge, the access opening must have a substantial width as measured in a direction along the front wall of the housing so that a tape loading element in the tape drive which serves to draw the magnetic tape outwardly or allow the magnetic tape to be withdrawn into the housing can move without being interfered by any other obstruction. This correspondingly results in the necessity of the slide shutter to t:ravel an increased stroke between the closed and opened positions.

When it comes to the slide shutter required to travel a substantial distance between the closed and opened positions, difficulties would be often encountered in choosing the biasing member for biasing the slide shutter normally towards the closed position and, also, optimizing the biasing force of such biasing member regardless of the position thereof between the closed and opened positions. Specifically, if the stroke of movement of the slide shutter between the closed and opened positions is of a small distance, the use of the standard single-coiled torsional spring would work sufficiently, provided that the wire forming the torsional spring and/or the number of turns of the single coil in the torsional spring are properly chosen and adjusted.

However, if such torsional spring is used in association with the increased stroke of movement of the slide shutter, the single-coiled torsional spring of a given size would exerts an insufficient biasing force with the spring arms expanding in respective directions away from each other. In other words, for a given size and design of the single-coiled torsional spring, the use thereof in association with the slide shutter is limited where a substantially equal quantity of the biasing force is desired or required regardless of the position of the slide shutter.

In addition, where the single-coiled torsional spring is used in the single-reel tape cartridge in an erected fashion with the spring arms extending in a plane parallel to the plane of the access opening or the front wall of the cartridge housing of a size so standardized that the cartridge can be compatible with any of the existing tape drives of different makes, the spring arms must have a limited length that is smaller than, for example, the thickness of the cartridge. Accordingly, the use of the slide shutter in the single-reel tape cartridge would pose a problem in that the distance of expansion of the spring arms in the respective opposite direction would be unable to cover the entire stroke of movement of the slide shutter.

Another problem associated with the increased stroke of movement of the slide shutter lies in that since the spring arms must be of a type capable of resiliently displacing or expanding a correspondingly increased distance relative to each other in the respective directions opposite to each other, the single-reel tape cartridge would exert the considerably varying biasing force. For this reason, even though the single-coiled torsional spring could successfully used in the single-reel tape cartridge, it is apparent that the biasing force exerted on the slide shutter in the closed position and that on the slide shutter in the opened position give rise to a considerable difference, and therefore the single-coiled torsional spring tends to be deteriorate when used for a prolonged period of time.

The extent of change of the biasing force exerted by the single-coiled torsional spring may be reduced if the number of turns forming the single coil in the torsional spring is increased. However, the increased number of the turns of the coil results in a corresponding increase of the axial length of the coil, requiring a relatively large space for installation in the cartridge housing, which in turn results in increase of the size of the cartridge housing.

In any event, the use of either the compression spring or the tension spring, even though having a small diameter, does not contribute to reduction in space required for installation thereof and, hence, the size of the cartridge housing.

SUMMARY OF THE INVENTION

Accordingly, the present invention has for its essential object to provide an improved recording medium cartridge of a type utilizing a slide shutter in combination with a twin-coiled torsional spring for biasing the slide shutter towards the closed position with a substantially equal quantity of the biasing force available throughout the entire stroke of movement of the slide shutter and regardless of the position of the slide shutter.

To this end, the present invention provides a cartridge including a housing having a medium chamber defined therein for accommodating the recording medium and also having at least one access opening defined therein, a slide shutter slidably mounted on the housing for movement between an opened position in which the access opening is opened and a closed position in which the access opening is closed, and a biasing member for biasing the slide shutter towards the closed position. The biasing member is in the form of a twin-coiled torsional spring including first and second coils connected together by means of a bridge and first and second spring arms extending outwardly from the first and second coils, respectively. The first spring arm has a free end engaged to the slide shutter and the second spring arm has a free end engaged to a portion of the housing.

The cartridge referred to above may be either the single-reel tape cartridge comprising a single reel rotatably housed therein and around which a length of magnetic recording tape is wound, or a disc cartridge comprising an information carrier disc such as a magnetic disc, an optical disc, or a magneto-optical disc, rotatably housed therein.

In the case of the single-reel tape cartridge, a generally elongated retainer member to which a free end of the magnetic recording tape is anchored. The retainer member is held at a retracted position inside the housing adjacent the access opening when the slide shutter is in the closed position, so that when the single-reel cartridge is loaded in a tape drive, the slide shutter is opened to allow a tape loading element of the tape drive to make access to the retainer member.

Preferably, the single-reel tape cartridge comprises the housing including a front wall and a guide wall confronting to and spaced a distance from the front wall inwardly of the housing. The front wall and the guide wall cooperate with each other to define a guide groove in which the slide shutter is slidably received for movement between the opened and closed positions. The twin-coiled torsional spring is preferably accommodated within a portion of the guide grooves on one side of the opened position of the slide shutter opposite to the closed position thereof, with the first and second spring arms extending in a plane substantially parallel to any one of the front and guide walls.

Preferably, the slide shutter is in the form of a generally rectangular plate including a rectangular shutter body for selectively opening and closing the access opening and an lateral extension formed integrally with the rectangular shutter body so as to extend from one of opposite ends of the shutter body that is adjacent the opened position of the slide shutter. The rectangular plate may have one corner area depleted to define a cutout at a location above the lateral extension for accommodating the twin coils of the torsional spring when the slide shutter is moved to the opened position to thereby avoid interference with the coils of the torsional spring.

That portion of the housing may have a first slot defined therein for receiving the free end of the second spring arm and the slide shutter has a second slot defined therein for receiving the free end of the first spring arm, at least one of the first and second slots extending in a direction generally perpendicular to a direction of movement of the slide shutter.

In the case of the disc cartridge, the housing includes first and second panels opposite to each other joined together by means of a peripheral wall with the medium chamber defined therebetween, with the access opening defined in at least the first panel. Alternatively, the access opening may be defined in each of the first and second panels in alignment with each other so that information can be recorded on or read from both surfaces of the disc.

The slide shutter used in the disc cartridge may be of a generally U-shaped configuration including first and second shutter areas and a connecting wall connecting the first and second shutter areas together, in which case the slide shutter is mounted exteriorly on the housing for sliding movement between the opened and closed positions, with the first and second shutter areas lying parallel to the first and second panels of the housing. The access openings are closed respectively by the first and second shutter areas when the slide shutter is in the closed position, but opened when the slide shutter is in the opened position.

Also, preferably, the connecting wall of the slide shutter may have a spring catch formed integrally therewith so as to protrude inwardly of the housing, and the free end of the first spring arm is connected with the spring catch in the connecting wall, whereas the free end of the second spring arm is connected to one of corner areas of the housing adjacent the opened position of the slide shutter.

The twin-coiled torsional spring used in the disc cartridge is preferably accommodated within a void space generally available at such one of the corner areas of the housing with the first and second spring arms extending generally parallel to any one of the first and second panels and towards a portion of the peripheral wall of the housing over which the slide shutter straddles. By so doing, the first and second spring arms can be brought close to each other when the slide shutter is moved to the closed position, but can be resiliently separated away from each other when the slide shutter is moved to the opened position. This twin coils of the torsional spring may, when the slide shutter is in the closed position, be positioned in abutment with another portion of the peripheral wall of the housing which lies substantially perpendicular to the first-mentioned portion of the peripheral wall of the housing.

Thus, according to the present invention, the twin-coiled torsional spring can advantageously be accommodated within a relatively small space, for example, a space delimited by the thickness of and between the front and guide walls of the single-reel tape cartridge housing, or a space delimited by the thickness of the disc cartridge housing, without incurring increase in size of the cartridge housing.

Considering that the twin-coiled torsional spring makes it possible to secure a required number of turns of each of the coils, the torsional spring can be effectively utilized in association with the increased stroke of movement of the slide shutter with the extent of change of the exerted biasing force reduced advantageously. Accordingly, the torsional spring employed in the present invention can be used and work for a prolonged period of time.

The presence of the two coils in the twin-coiled torsional spring is effective to reduce the length of each coil as compared with the single coil in the single-coiled torsional spring for a given quantity of the biasing force exerted, and this in turn makes it possible to install the twin-coiled torsional spring within a limited available space such as described above.

When the twin-coiled torsional spring is used in the single-reel tape cartridge and is accommodated within the space between the front and guide walls of the cartridge housing as hereinbefore described, the torsional spring behaves in the following manner. When the slide shutter is held in the closed position, the spring arms of this torsional spring expand a maximum distance away from each other, but as the slide shutter is moved towards the opened position, the spring arms are brought close towards each other. At this time, if the respective free ends of the spring arms are fixed, the twin coils of the torsional spring moves up and down in a plane parallel to the plane of the movement of the slide shutter as the latter is moved between the closed and opened positions.

Accordingly, although the twin-coiled torsional spring may be effectively utilized if the space for installation of this torsional spring is of a size sufficient to accommodate the movement of the twin coils that takes place in the manner described above, the use of the anchor slots, one defined in the slide shutter and the other defined in the guide wall for slidable anchorage of the respective free ends of the spring wires, is particularly advantageous in that an unnecessary movement of the twin coils within the limited space can be avoided.

Although the idea of use of the anchor slots discussed above may be equally employed in the disc cartridge, the disc cartridge housing has a void space available at each of the four corner region, and the void space is of a size sufficient to accommodate the movement of the twin coils of the torsional spring. Thus, the void space generally found in the disc cartridge is maximally efficiently utilized to accommodate the twin-coiled torsional spring in accordance with the present invention.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE EMBODIMENTS

First Embodiment—FIGS. 1 to 6

Figure 1:
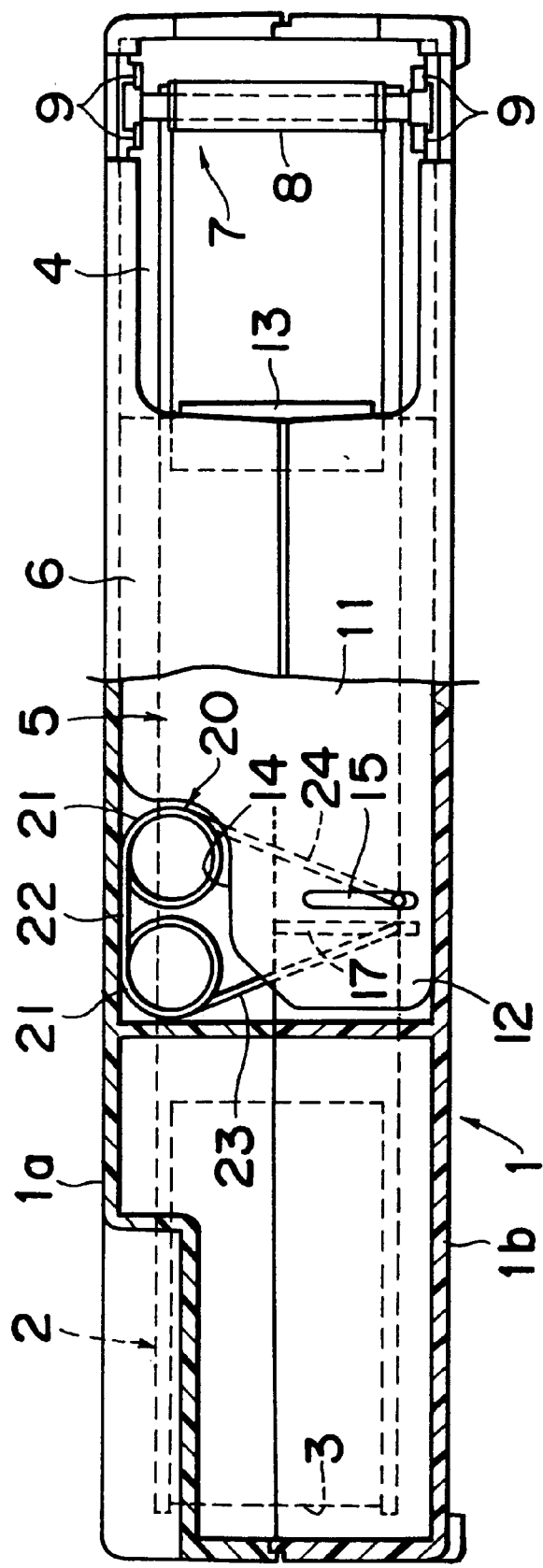
FIG. 1 is a front sectional view, with a portion cut away, of a single-reel tape cartridge according to a first preferred embodiment of the present invention, with a slide shutter opened.
Figure 2:
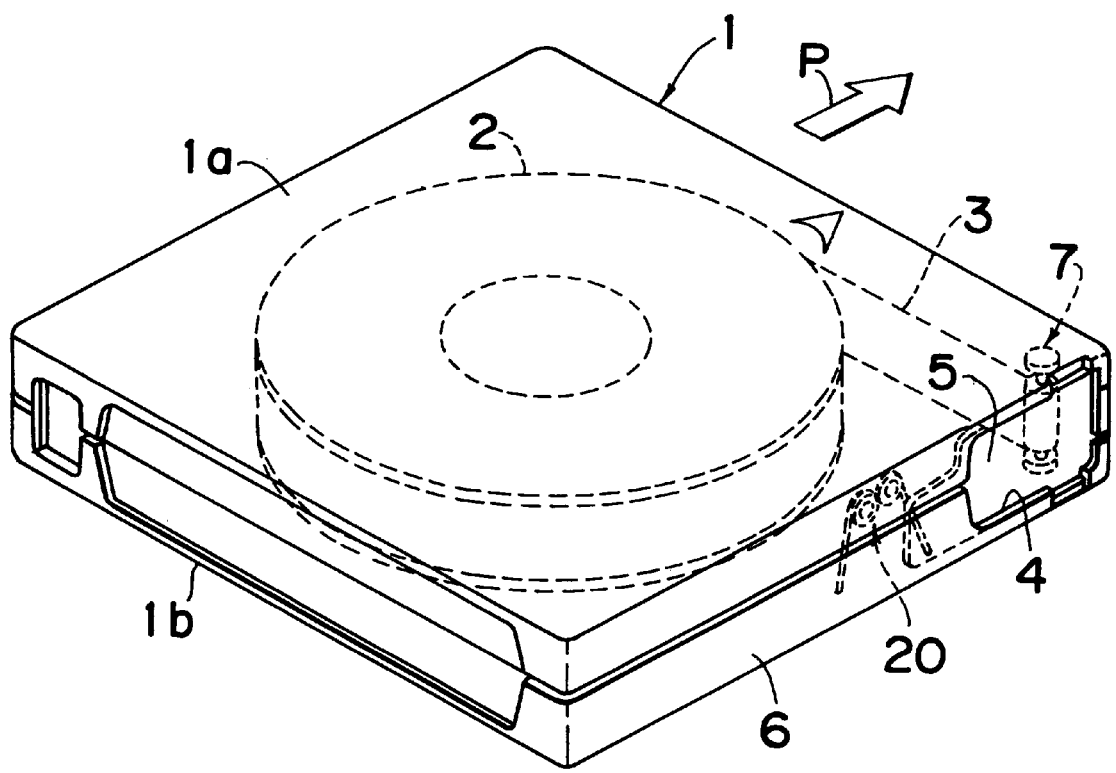
FIG. 2 is a perspective view of the single-reel tape cartridge shown in FIG. 1.

Referring first to FIGS. 1 to 6, there is shown a first preferred embodiment of the present invention which is directed to a single-reel magnetic tape cartridge. As best shown in FIG. 2, the single-reel magnetic tape cartridge comprises a generally rectangular box-like housing 1 made up of upper and lower casings 1a and 1b joined together in any known manner to define a tape chamber. The housing 1 so formed includes top and bottom panels, a peripheral front wall 6, a peripheral rear wall opposite to the front wall 6 and first and second peripheral side walls opposite to each other and accommodates therein a single reel 2 around which a length of magnetic tape 3 is wound. When in use with a tape drive such as, for example, used in association with a computer, the single-reel magnetic tape cartridge is loaded into the tape drive in a direction shown by the arrow P with one of the side walls, for example, the first side wall of the housing 1 oriented towards the tape drive. The front wall 6 has one end portion adjacent the first side wall formed with a rectangular opening 4 through which the magnetic tape 3 is drawn into or out of the tape chamber in the housing 1.

Figure 3:
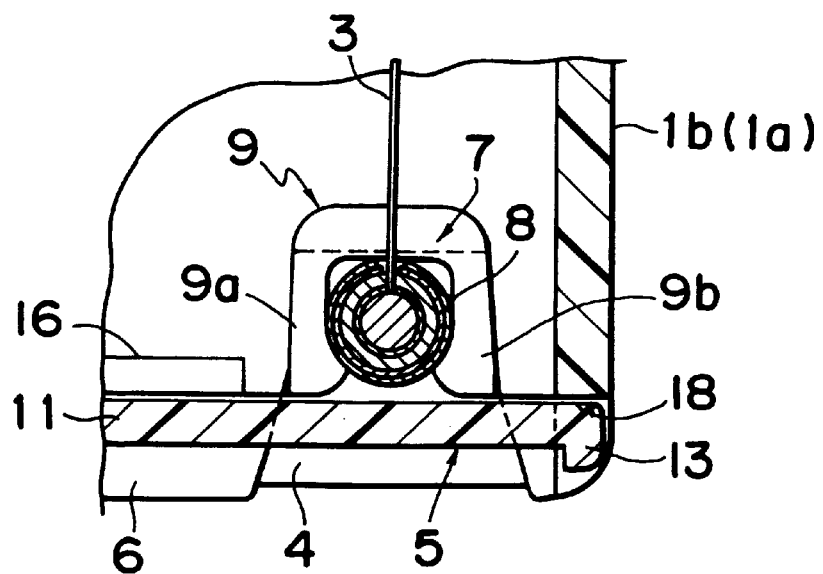
FIG. 3 is a fragmentary top sectional view of one corner of the single-reel tape cartridge of FIG. 1, showing the details of a retainer pin secured to a free end of the length of magnetic tape.
Figure 6:
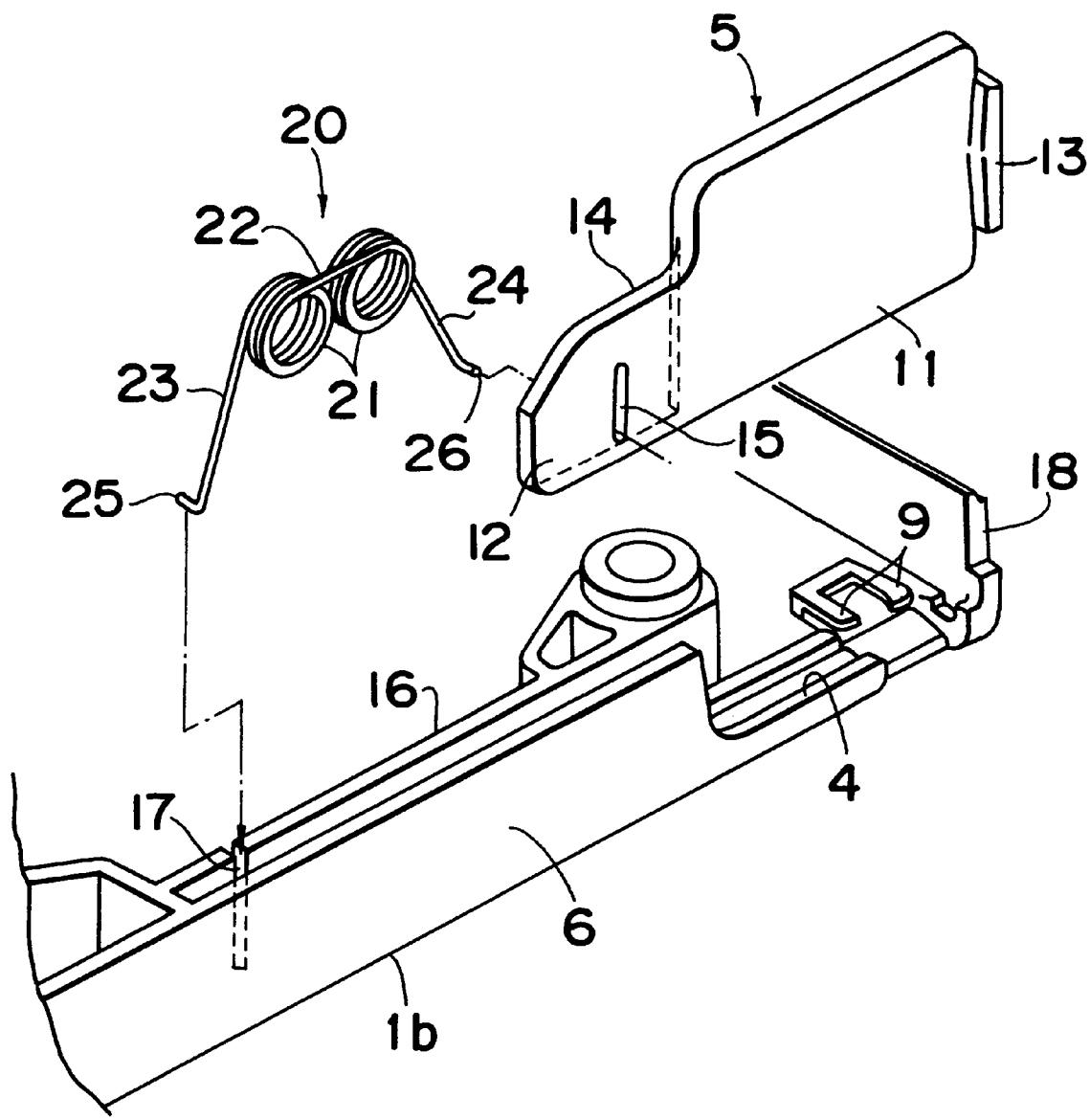
FIG. 6 is an exploded view of a portion of the single-reel tape cartridge, showing the manner in which a twin-coiled torsional spring and the slide shutter are mounted.

The housing 1 also includes a slide shutter 5 movable between opened and closed positions in a direction lengthwise of the front wall 6 for selectively opening and closing the rectangular opening 4, respectively. The slide shutter 5 is in the form of a generally rectangular flat plate with its longitudinal sense aligned with the longitudinal sense of the front wall 6 and has a tab 13 formed integrally therewith so as to lie perpendicular to the remaining body of the slide shutter 5. As clearly shown in FIGS. 3 and 4, a substantially right-angled joint between the front wall 6 and the first side wall of the housing 1. For example, one end of the first side wall adjacent the front wall 6 as clearly shown in FIG. 6, is formed with a cutout 18 which, when the slide shutter 5 is held in the closed position as shown therein, receives the tap 13 of the slide shatter 5 to keep the tape chamber dust-proof.

free end of the magnetic tape 3 remote from the reel 2 is anchored to a retainer pin 7 that can be caught at a predetermined position within the tape chamber and inwardly adjacent the rectangular opening 4 when the length of magnetic tape 3 is drawn into the tape chamber and completely wound around the reel 2, in a manner which will now be described. The retainer pin 7 has; a length greater than the width of the length of magnetic tape 3 and has its opposite ends protruding outwardly of the opposite side edges of the magnetic tape 3 when the latter is anchored thereto. More specifically, as shown in FIG. 3, the free end of the magnetic tape 3 is anchored to the retainer pin 7 by turning it around the pin 7 and then mounting a C-clip 8 externally around the pin 7 with that free end of the tape 3 retained firmly in position around the pin 7.

Generally U-shaped stays 9 each having a pair of elastically deformable fingers 9a and 9b connected at one end together through a transverse body are fitted to respective inner surfaces of the top and bottom panels of the housing 1 with their transverse bodies fixed thereto. These stays 9 are so positioned adjacent the rectangular opening 4 with the opening of the U-shape oriented towards the rectangular opening 4 that, when the length of magnetic tape 3 is drawn into the tape chamber and completely wound around the reel 2, the opposite ends of the retainer pin 7 are caught in respective U-shaped spaces and retained in position by the elasticity of the fingers 9a and 9b as clearly shown in FIG. 3. Thus, it will readily be seen that when the length of magnetic tape 3 is drawn into the tape chamber and completely wound around the reel 2 and the slide shutter 5 is held in the closed position, the retainer pin 7 is retained in position inwardly adjacent the slide shutter 5 with its opposite ends caught by the respective stays 9.

Although not shown, when the tape cartridge is inserted into the tape drive, a loading member provided in the tape drive grips, while the slide shutter 5 is in the opened position, the opposite ends of the retainer pin 7 clear of the C-clip 8 and pulls or pushes the retainer pin 7 out of or into the tape chamber, respectively. As a matter of course, when the retainer pin 7 is pushed into the tape chamber by the loading member, the reel 2 is suitably driven to wind up the length of magnetic tape 3 and, at this time, the opposite ends of the retainer pin 7 are forced into the respective U-shaped spaces while pushing the elastically deformable fingers 9a and 9b away from each other against the respective elasticity thereof. The manner of use of the tape cartridge described above is well known to those skilled in the art and, therefore, no further detail will be reiterated for the sake of brevity. In any event, as is well known to those skilled in the art, the rectangular opening 4 has a substantial width as measured in a direction lengthwise of the front wall 6 to allow the loading member to selectively project into or withdraw from the tape chamber.

Referring to FIG. 6, the slide shutter 5 is of one-piece construction made of plastics and including a rectangular body 11 for selectively opening and closing the rectangular opening 4 and an lateral extension 12 positioned inwardly of the front wall 6. The tab 13 referred to above and adapted to be engaged with an operating member (not shown) in the tape drive is integrally formed with that end of the slide shutter 5 opposite to the lateral extension 12. The lateral extension 12 is of a size and shape having a lower edge flush with a lower edge of the rectangular body 11 and also having an upper edge stepped downwardly from an upper edge of the rectangular body 11 so as to define a generally L-shaped cutout 14.

In addition, the lateral extension 12 has an outer surface adjacent the front wall 6 and in flush with a corresponding outer surface of the rectangular body 11 and also having an inner surface remote from the front wall 6 and confronting the tape chamber, said inner surface being set back from the corresponding inner surface of the rectangular body 11 a predetermined distance sufficient to accommodate one (24) of opposite spring arms 23 and 24 of a biasing member 20 which would become clear from the subsequent description.

For the reason which will become clear from the subsequent description, the lateral extension 12 having a thickness smaller than that of the rectangular body 11 is formed with a slot 15 defined therein so as to extend in a direction perpendicular to the direction of movement of the slide shutter 5. The L-shaped cutout 14 referred to above is necessitated to avoid any possible interference between the slide shutter 5 and the biasing member 20, particularly coiled portions 21 of the biasing member 20 when the shutter is moved towards the opened position.

Figure 5:
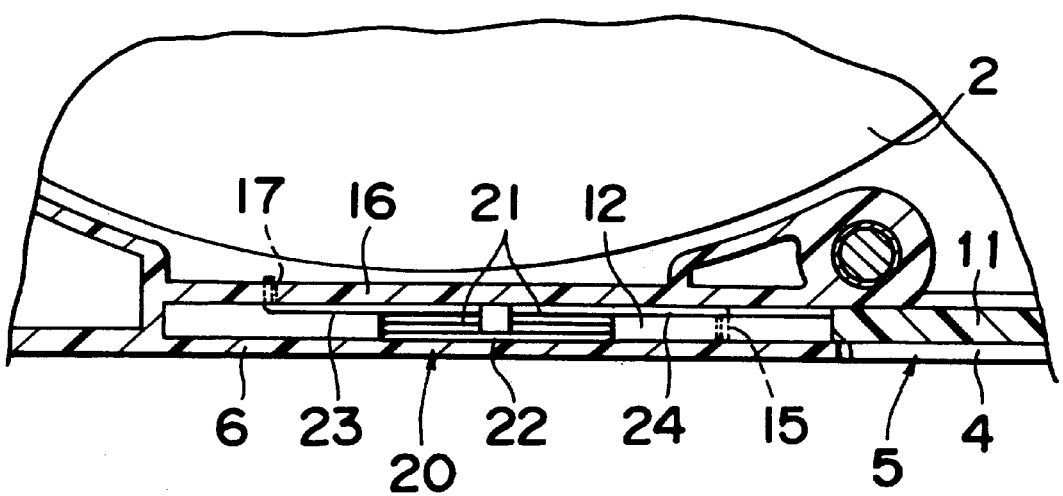
FIG. 5 is a cross-sectional view, on an enlarged scale, taken along the line A—A in FIG. 4.

As shown in FIG. 5, the slide shutter 5 is slidably supported in between the front wall 6 and a guide wall 16 positioned inwardly of the front wall 6 and spaced therefrom a distance slightly greater than the thickness of the rectangular body 11 of the slide shutter 5. As is the case with the front wall 6, the guide wall 16 may be made up of upper and lower guide wall portions integral with the upper and lower casings 1a and 1b, respectively, and gains its shape when the upper and lower casings 1a and 1b are joined together. Even this guide wall 16 has a rectangular opening defined therein at a location aligned with the rectangular opening 4. Alternatively, although not show, a guideway for guiding the sliding motion of the slide shutter 5 may comprise upper and lower grooves one defined in the top panel of the housing 1 by an upper rail in cooperation with the upper edge of the front wall 6 and the other defined in the bottom panel of the housing 1 by a lower rail in cooperation with the lower edge of the front wall 6.

Figure 4:
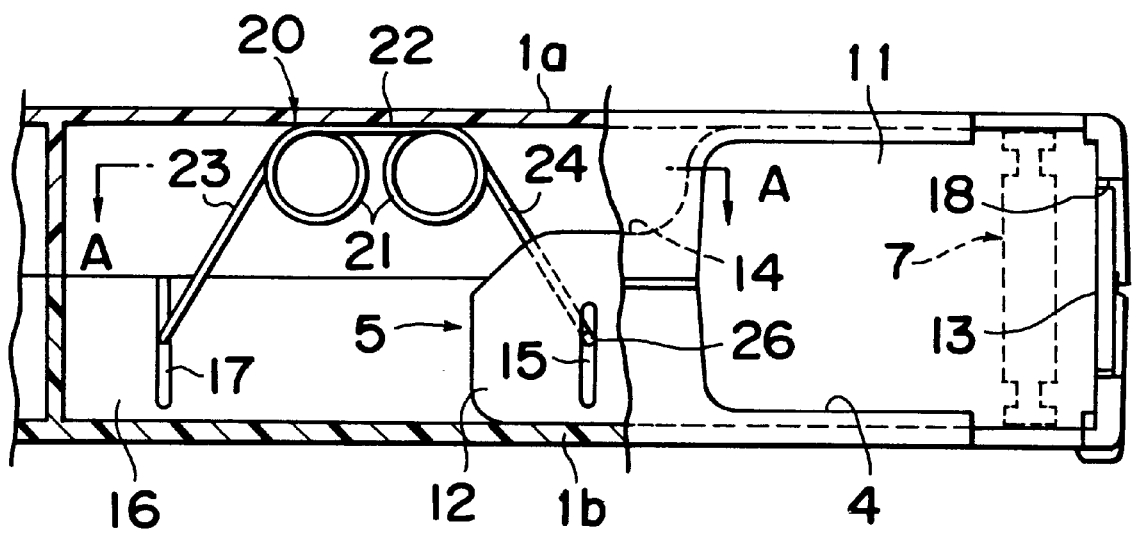
FIG. 4 is a fragmentary front sectional view substantially similar to FIG. 1, showing the slide shutter opened.

By the reason which will become clear from the subsequent description, a catch 17 in the form of a slot or clevis is formed in the guide wall 16, particularly, the lower guide wall portion integral with the lower casing 1b, as shown in FIG. 6, which catch 17 is positioned spaced a distance from the slot 15 in the slide shutter 5 towards the second side wall of the housing 1 as can be seen from FIG. 4. As a matter of design, this catch 17 is invisible from outside since it is defined in the guide wall 16 that is positioned inwardly of the front wall 6 with respect to the tape chamber.

The biasing member 20 for normally urging the slide shutter 5 towards the closed position comprises a twin-coiled torsional spring including, in addition to the spring arms 23 and 24 referred hereinbefore, two coils 21 with a bridge 22 connecting them together, as clearly shown in FIG. 6. This twin-coiled torsional spring 20 is prepared from a single length of wire with the spring arms 23 and 24 extending generally in the same direction outwardly from the respective coils 21 and with the coils 21 having been set to allow the spring arms 23 and 24 to resiliently expand in respective directions away from each other. Each of the spring arms 23 and 24 has a free end remote from the respective coil 21 which is bent transverse to define an engagement pawl 25 or 26 that is adapted to loosely engage in the associated slot 17 or 15. Specifically, the engagement pawls 25 and 26 integral with the spring arms 23 and 24, respectively, are oriented in respective directions opposite to each other.

In an assembled condition of the tape cartridge according to the present invention, this twin-coiled torsional spring 20 is accommodated in between the front wall 6 and the guide wall 16 with the engagement pawls 25 and 26 slidingly received within the slots 17 and 15 as clearly shown in FIGS. 1 and 4. Accordingly, in this condition, the twin-coiled torsional spring 20 normally biases the slide shutter 5 towards the closed position as shown in FIG. 4, in which condition the twin coils 21 are held in contact with the top panel of the housing 1 and substantially clear of the L-shaped cutout 14 in the slide shutter 5, but when the slide shutter 5 is moved to the opened position against the resilient force exerted by the torsional spring 20, the twin coils 21 are positioned within the L-shaped cutout 14 as shown in FIG. 1. Movement of the slide shutter 5 towards the opened position is effected by the operating member (not shown) in the tape drive which, as the tape cartridge is inserted into the tape drive, engages the tab 13 integral with the slide shutter 5 and then drive the slide shutter 5 towards the opened position against the resiliency of the torsional spring 20. It is to be noted that each of the twin coils 21 has a thickness slightly smaller than the internal spacing between the front wall 6 and the guide wall 16.

As the slide shutter 5 is moved towards the closed position, the spring arms 23 and 24 are drawn close towards each other with the coils 21 deformed or compressed circumferentially inwardly to accumulate respective restoring forces that will act to bias the slide shutter 5 towards the closed position. At this time, since the twin coils 21 are held substantially immovable in contact with the top panel of the housing 1, the engagement pawls 25 and 26 slide downwardly within the respective slots 17 and 15 to thereby accommodate change in size of the torsional spring 20.

From the foregoing, it has now become clear that the L-shaped cutout 14 in the slide shutter 5 is necessitated to allow the lateral extension 12 to move underneath the twin coils 21 as the slide shutter 5 is moved towards the opened position. After the slide shutter 5 has completely been moved to the opened position, the loading member in the tape drive will pull the retainer pin 7 out of the tape chamber to draw the length of magnetic tape 3 outwardly of the tape cartridge.

Considering that the housing 1 is made up of the upper and lower casings 1a and 1b, mounting of the slide shutter 5 and its associated component parts including the torsional spring 20 can readily and easily be accomplished. More specifically, before the upper and lower casings 1a and 1b are joined together, the slide shutter 5 and the torsional spring 20 having the engagement pawl 26 received in the slot 15 in the slide shutter are inserted in between the front wall 6 and the guide wall 16, followed by insertion of the engagement pawl 25 into the slot 17 in the guide wall 16. After the slide shutter 5 and the torsional spring 20 have been mounted in this manner, the spring arms 23 and 24 expands outwardly to bring the slide shutter 5 to the closed position and, therefore, there is little possibility that the torsional spring 20 may jump out of the position when the upper casing 1a is to be mounted onto the lower casing 1b to complete the housing 1.

Although the preferred embodiment of the tape cartridge has been described with reference to FIGS. 1 to 6, it is to be noted that in place of the slot 15 in the slide shutter 5, an elongated groove may be employed that opens downwardly from the lower side edge of the lateral extension 12. Also, in place of the slots 15 and 17, round perforations sufficient to receive therein the engagement pawls 26 and 25 may be employed, in which case a sufficient space should be provided between the top panel of the housing 1 and the twin coils 21 so that during the movement of the slide shutter 5 between the opened and closed positions the twin coils 21 can move up and down. Also, the guide wall 16, although described as made up of the guide wall portions integral respectively with the upper and lower casings 1a and 1b, may be integrally formed with either one of the upper and lower casings 1a and 1b.

The present invention is equally applicable to a DAT (digital audio tape) cartridge of a structure wherein a slide shutter is supported for movement between projected and retracted position along a bottom wall of the rectangular box-like casing for selectively opening and closing a bottom opening that is communicated with a front opening through which a length of tape is loaded or unloaded. In this case, the twin-coiled torsional spring shown by 20 in the foregoing embodiment can be employed in association with the bottom slide shutter.

Second Embodiment—FIGS. 7 to 11

Figure 7:
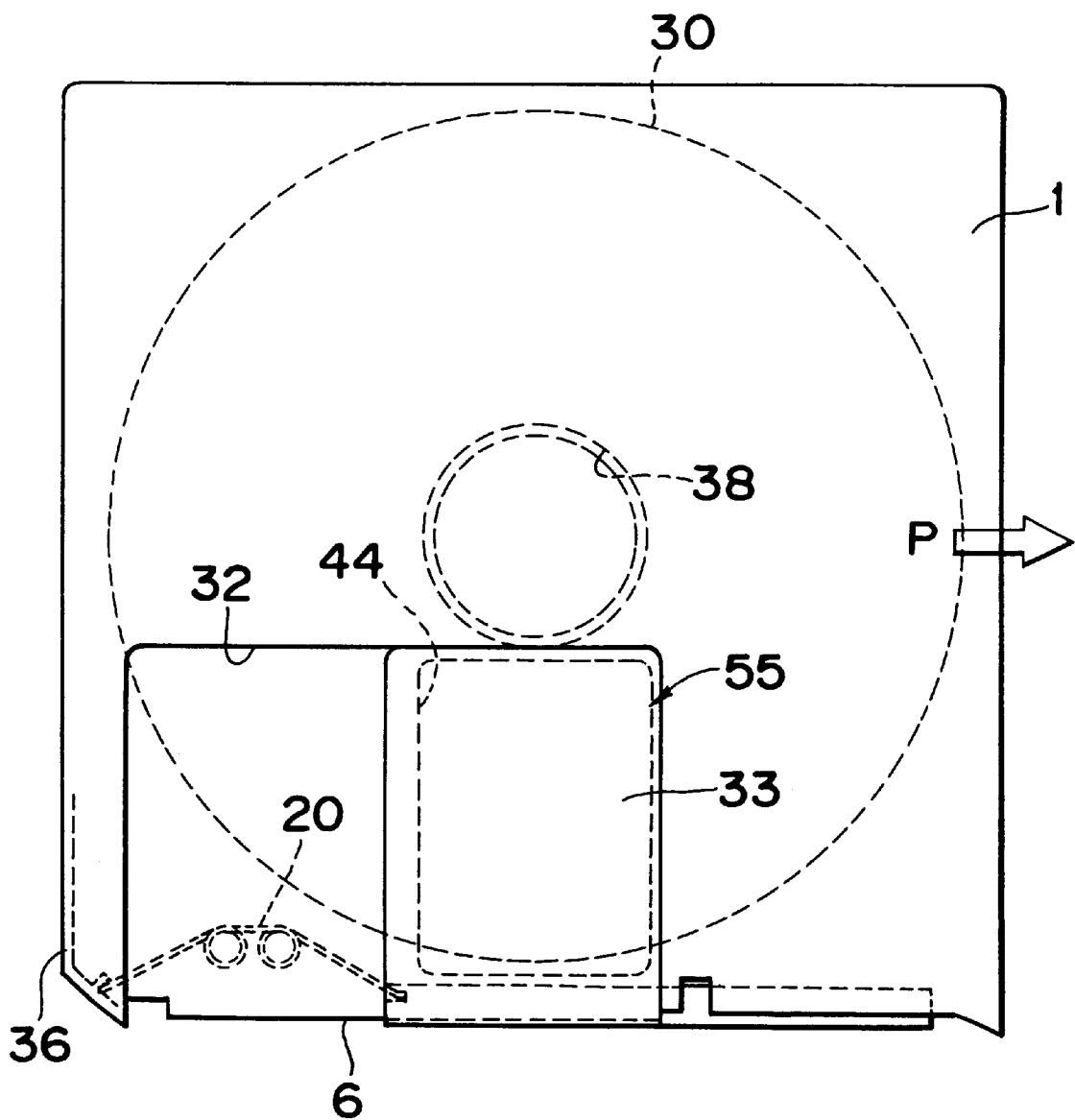
FIG. 7 is a top plan view of a disc cartridge, with the slide shutter closed, according to a second preferred embodiment of the present invention.
Figure 8:
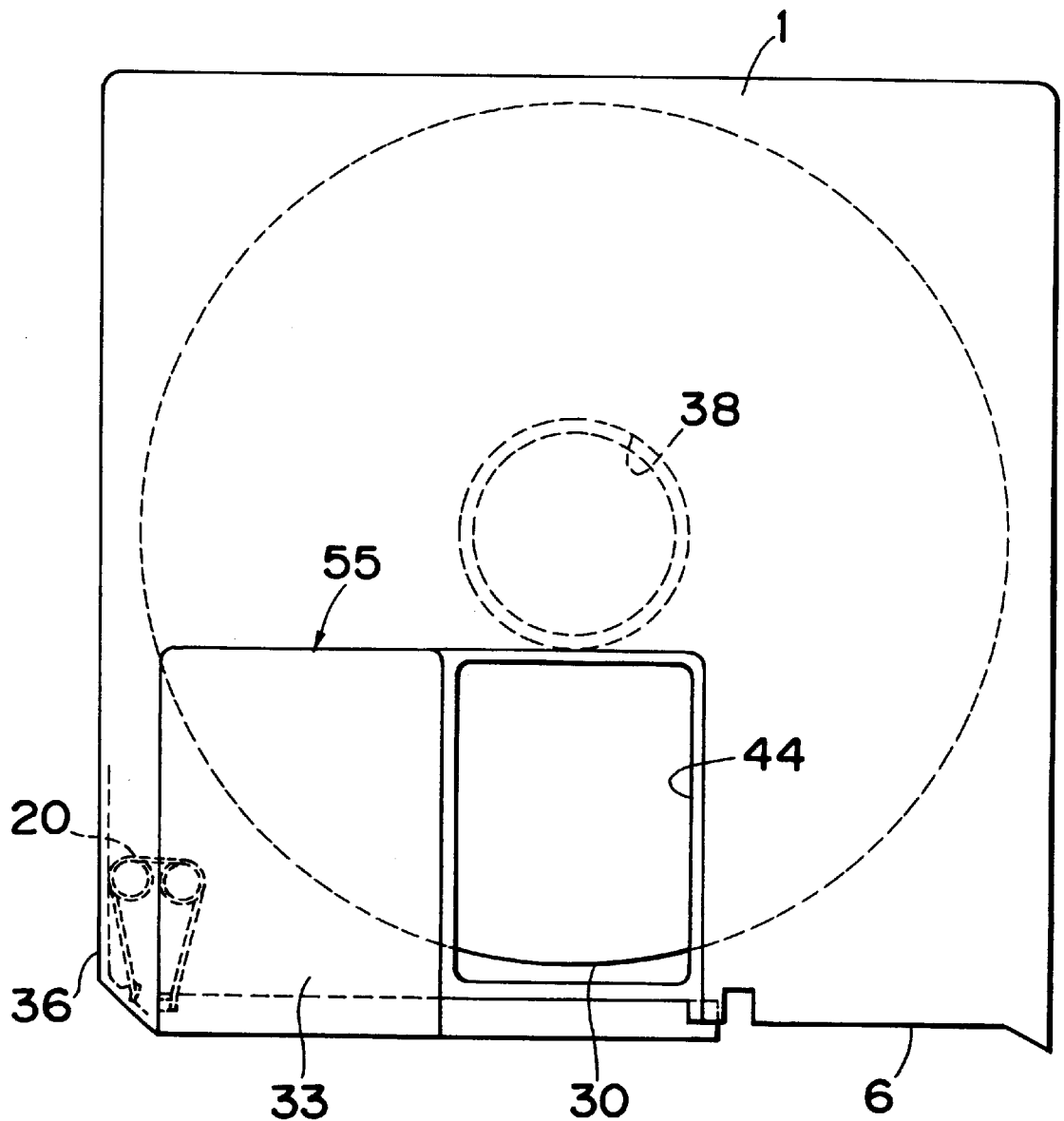
FIG. 8 is a view similar to FIG. 7, with the slide shutter opened.

Referring to FIGS. 7 to 11, there is shown a second preferred embodiment of the present invention which is directed to a disc cartridge accommodating therein a magneto-optical recording disc 30. As shown in FIGS. 7 and 8, the disc cartridge comprises a generally square box-like flat housing 1 made up of upper and lower casings 1a and 1b joined together in any known manner to define a disc chamber. The housing 1 so formed includes top and bottom panels 31a and 31b, a peripheral front wall 6, a peripheral rear wall opposite to the front wall 6 and first and second peripheral side walls opposite to each other and accommodates therein the magneto-optical disc 30.

The top and bottom panels of the housing 1 has an access window 44 defined therein at a respective location adjacent the front wall 6 and substantially intermediate of the length of the front wall 6 (or the width of the housing 1). The respective access windows 44 in the top and bottom panels are aligned with each other as is well known to those skilled in the art. A generally U-shaped slide shutter 55 preferably made of plastics includes top and bottom shutter areas 33a and 33b (FIG. 9) and a connecting wall 34. This slide shutter 5 is mounted exteriorly on the housing 1 for sliding movement between opened and closed positions with the top and bottom shutter areas 33a and 33b lying parallel to the top and bottom panels of the housing 1. The disc 30 rotatably accommodated within the disc chamber has one or both of opposite surfaces adapted for information to be recorded thereon or read therefrom and also has a center hole defined therein for receiving a drive element of the disc drive (not shown). To permit the drive element of the disc drive to drive the disc 30 in one direction about the center hole, a hub drive hole 38 is defined at a center portion of the bottom panel 31b of the housing 1 in alignment with the center hole of the disc 30.

To facilitate a stabilized sliding motion of the shutter 55 without allowing the top and bottom shutter areas 33a and 33b to flap relative to the top and bottom panels 31a and 31b of the housing 1, a guide groove 32 is formed on an outer surface of each of the top and bottom panels 31a and 31b so as to extend in a direction parallel to the direction of movement of the shutter 55 over a distance generally corresponding to the stroke of movement of the shutter 55 between the closed and opened positions. Respective free ends of the top and bottom shutter areas 33a and 33b remote from the connecting wall 34 are slidingly retained in and guided by the respective guide grooves 32.

Figure 9:
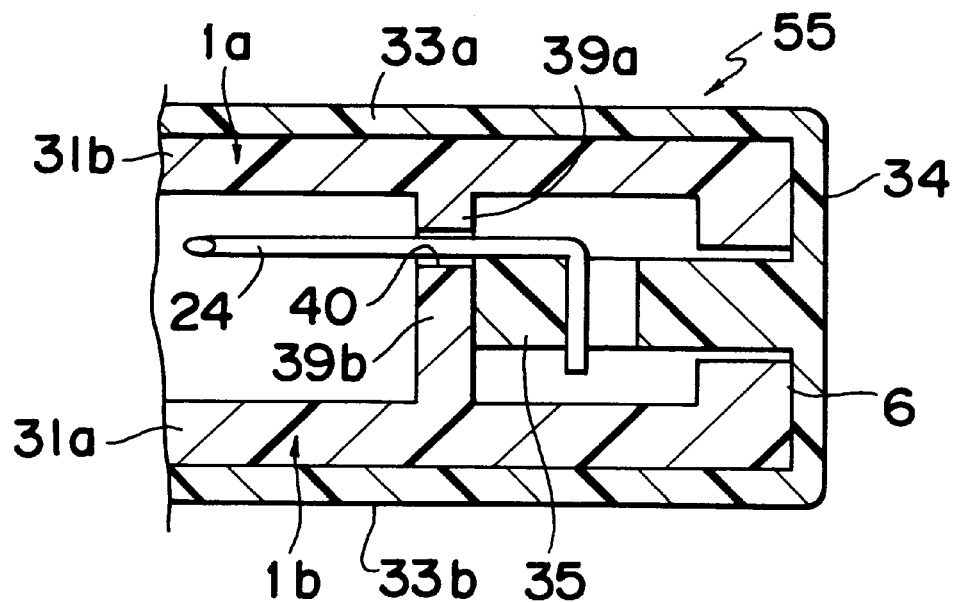
FIG. 9 is a schematic side sectional view, on an enlarged scale, of a front portion of the disc cartridge.
Figure 10:
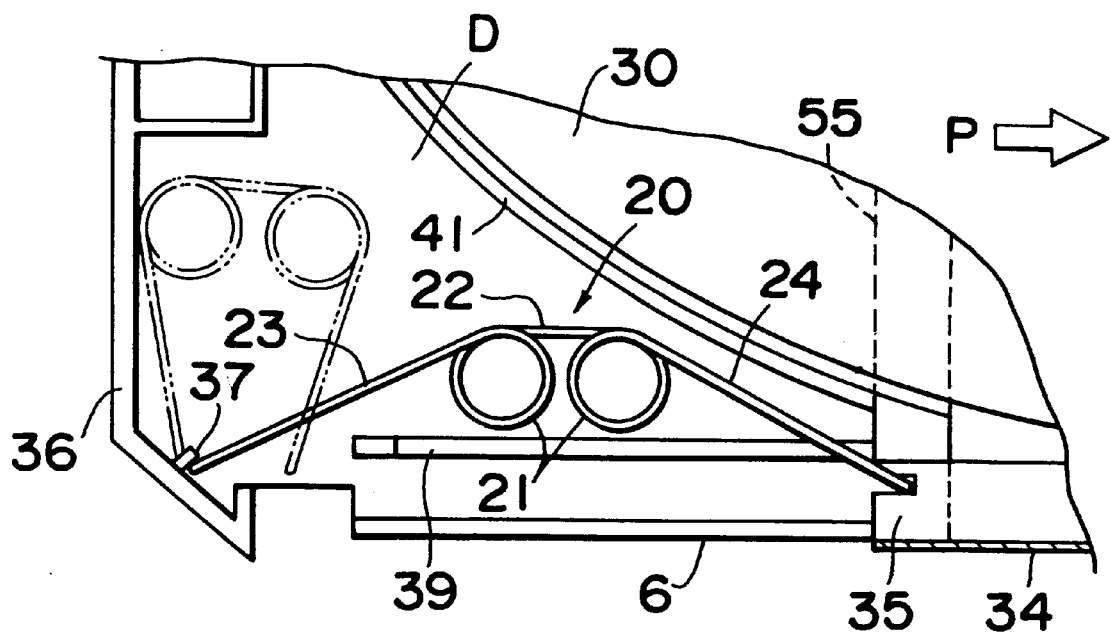
FIG. 10 is a top plan view, with a top casing removed, showing a condition of the torsional spring when the slide shutter is closed.

The twin-coiled torsional spring 20 is utilized to normally bias the shutter 1 towards the closed position as shown in FIGS. 7 and 10. As best shown in FIG. 9, the connecting wall 34 of the slide shutter 55 is formed integrally with a guide rib 35 protruding into a guide groove defined in the front wall 6 of the housing 1 and between the top and bottom panels 31a and 31b, which guide rib 35 concurrently serves as a sprint catch to which the free end of the spring arm 24 is anchored. Since as is well known to those skilled in the art the disc 30 is round in shape while the housing 1 is generally square in shape having generally angled corners 36, the disc chamber inside the disc cartridge has four corner areas that are void. One of those corner areas of the disc chamber which is generally triangular in shape, for example, the front left corner area D as viewed in FIGS. 7, 8, 10 and 11, is used to house the twin-coiled torsional spring 20. The free end of the opposite spring arm 23 of the twin-coiled torsional spring 20 then housed within the front left corner area D is anchored to a retainer projection 37 formed integrally with one end of the second side wall of the housing 1 adjacent the front wall 6 so as to protrude into the front left corner area D.

A left end portion of the front wall 6 aligned with the front left corner area D of the disc chamber and including the generally angled corner 36 is depleted to allow the front left corner area D to be communicated with the outside of the housing 1, and the twin-coiled torsional spring 20 is inserted into the front left corner area D through the depleted end portion of the front wall 6. As shown in FIG. 9, the top and bottom panels 31a and 31b of the housing 1 are integrally formed with respective guide walls 39a and 39b so as to protrude into the front left corner area D and as to terminate spaced from each other to define a guide gap 40 therebetween. The guide rib 35 integral with the connecting wall 34 of the shutter 55 terminates within a portion of the front left corner area D adjacent the front wall 6 and is held in sliding contact with one of the guide walls, for example, the guide wall 39b that guides the guide rib 35 during the sliding movement of the slide shutter 55.

As shown in FIG. 10, the housing 1 has a generally round partition wall 41 positioned radially outwardly of the disc 30, and a portion of this round partition wall 41 adjacent the front left corner area D serves as a sealing wall to avoid ingress of dust from the outside of the housing 1 into the inside of the round wall 41.

As has been discussed with reference to FIG. 6, the twin-coiled torsional spring 20 employed in the embodiment shown in FIGS. 8 to 11 similarly includes the two coils 21, the bridge 22 connecting the two coils 21 together and the spring arms 23 and 24 extending outwardly from the associated coils 21. As a matter of course, this twin-coiled torsional spring 20 is prepared from a single length of wire with the coils 21 having been set to allow the spring arms 23 and 24 to resiliently expand in respective directions away from each other.

As best shown in FIG. 10, the twin-coiled torsional spring 20 loosely housed within the front left corner area D with the juxtaposed coils 22 loosely sandwiched between the top and bottom panels 31a and 31b (FIG. 9) of the housing 1 is positioned with the opposite spring arms 23 and 24 engaged at their free end to the retainer projection 37 and the guide rib 35 to bias the slide shutter 55 towards the closed position. It is to be noted that the spring arm 24 having the free end thereof engaged to the guide rib 35 loosely extends through the guide gap 40 between the guide walls 39a and 39b. Although not shown, the disc cartridge may have a releasable lock means for locking the slide shutter 55 in the closed position.

Figure 11:
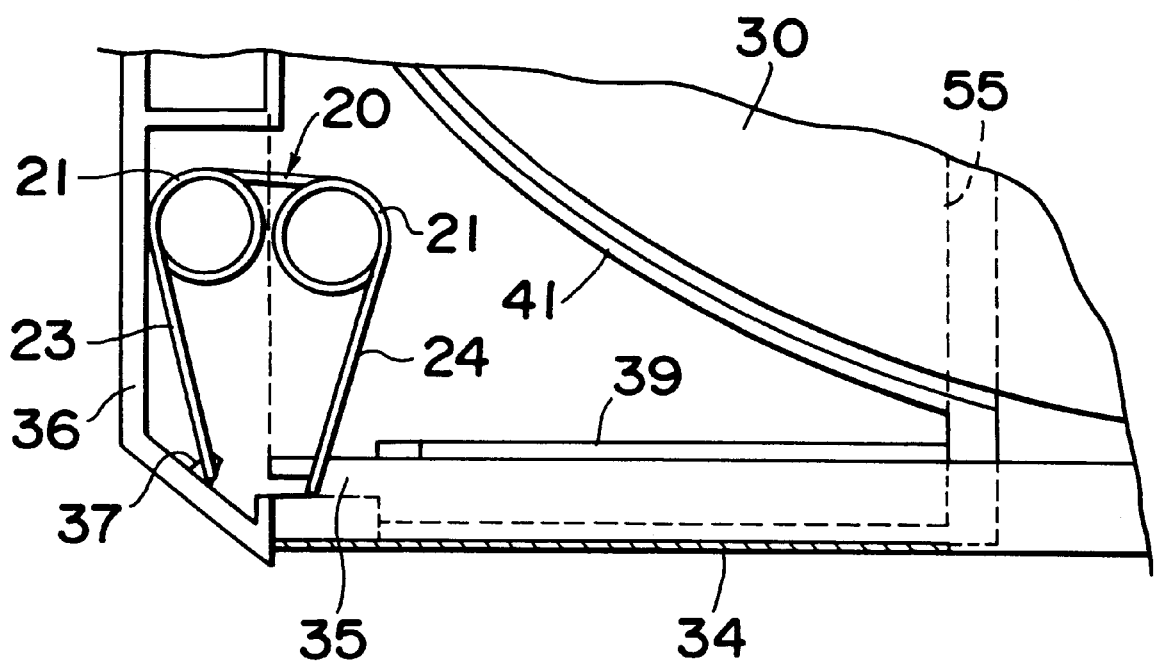
FIG. 11 is a top plan view, with a top casing removed, showing a different condition of the torsional spring when the slide shutter is opened.

When and so long as the slide shutter 55 is held in the closed position as biased by the twin-coiled torsional spring 20, the spring arms 23 and 24 expand resiliently in the respective directions away from each other as shown by the solid line in FIG. 10 with the twin coils 21 positioned close towards the front wall 6. On the other hand, when the slide shutter 55 is moved to the opened position as shown in FIG. 8 against the biasing force of the twin-coiled torsional spring 20, the spring arms 23 and 24 are brought close towards each other as shown in FIG. 11 and by the phantom line in FIG. 10 with the twin coils 21 having moved away from the front wall 6 and also from a portion of the partition wall 41 adjacent the front left corner area D. This movement of the twin coils 21 within the front left corner area D is in no way interfered by that portion of the partition wall 41 and the distance between the twin coils 21 and that portion of the partition wall 41, and also the distance between the twin coils 21 and the front wall 6 progressively increase as the slide shutter 5 is moved from the closed position towards the opened position. At the time the slide shutter 55 reaches the opened position, the twin coils 21 are blocked by the second side wall of the housing 1.

Given the single-coiled torsional spring employed in the prior art disc cartridge and the twin-coiled torsional spring employed in the present invention exerts an equal biasing force, the distance between the coils 21 of the twin-coiled torsional spring 20 and the front wall 6, which progressively increases as the slide shutter 55 is moved towards the opened position, is smaller than that exhibited by the single-coiled torsional spring employed in the prior art disc cartridge.

In any event, the movement of the slide shutter 55 towards the closed position is effected by the biasing force of the twin-coiled torsional spring 20, whereas the movement of the slide shutter 55 from the closed position towards the opened position is effected by a shutter opener (not shown) provided in the disc drive (not shown) as the disc cartridge is inserted into the disc drive in the direction P as is well known to those skilled in the art.

While the disc cartridge according to the second embodiment of the present invention has been fully described, it is to be noted that various changes and modifications are apparent to those skilled in the art. For example, although in the foregoing embodiment the twin-coiled torsional spring 20 has been shown as accommodated within the front left corner area D, it may be accommodated within the front right corner area D as viewed in FIGS. 7 and 8. Also, the disc 30 may be any known disc-shaped recording medium such as a magnetic disc, an optical disc or a magneto-optical disc. Moreover, the direction of insertion of the disc cartridge may not be limited to the direction shown by the arrow P, but the disc cartridge embodying the present invention may be inserted in the disc drive with, for example, the front wall 6 oriented towards the disc drive. Yet, the corner 36 may not be angled as shown, but may be right-angled or rounded.

Although the present invention has been described in connection with the preferred embodiments thereof with reference to the accompanying drawings, it is to be noted that various changes and modifications are apparent to those skilled in the art. For example, although the twin-coiled torsional spring 20 has been shown of a design in which the bridge 22 connecting the coils 21 together extends in a plane parallel to and spaced from the plane in which both of the spring arms 23 and 23 lie as best shown in FIG. 6, the bridge 22 may extend from one end of one of the coils 22 to one end of the other of the coils 22 which is offset relative to such one end of one of the coils 22. Also, the bridge 22 may not be positioned on one side of the associated coils 21 remote from the spring arms 23 and 24 and may be positioned on the other side of the associated coils 21 adjacent the spring arms 23 and 24. In any event, any twin-coiled torsional spring made of a single wire suffices.

Accordingly, such changes and modifications are to be understood as included within the scope of the present invention as defined by the appended claims, unless they depart therefrom.

What is claimed is:

1. A cartridge for accommodating a recording medium, which cartridge comprises:

a housing having a medium chamber defined therein for accommodating the recording medium, said housing having at least one access opening defined therein;

a slide shutter slidably mounted on the housing for movement between an opened position in which the access opening is opened and a closed position in which the access opening is closed; and a biasing member for biasing the slide shutter towards the closed position, said biasing member comprising a twin-coiled torsional spring including first and second coils connected together by a bridge and first and second spring arms extending outwardly from the first and second coils, respectively, said first spring arm having a free end engaged to the slide shutter and said second spring arm having a free end engaged to a portion of the housing, wherein the recording medium is a length of magnetic recording tape, and further comprising a single reel around which the length of magnetic recording tape is wound with one of opposite ends thereof anchored to the reel, said reel being housed rotatably within the medium chamber; a generally elongated retainer member to which the other of the opposite ends of the magnetic recording tape is anchored; and a holder for holding the retainer member at a retracted position inside the housing adjacent the access opening when the slide shutter is in the closed position.

2. The cartridge as claimed in claim 1, wherein the housing includes a front wall and a guide wall confronting to and spaced a distance from the front wall inwardly of the housing, said front wall and said guide wall cooperating with each other to define a guide groove, said slide shutter being slidably received in said guide groove for movement between the opened and closed positions, and wherein said twin-coiled torsional spring is accommodated within a portion of the guide grooves on one side of the opened position of the slide shutter opposite to the closed position thereof, with the first and second spring arms extending in a plane substantially parallel to any one of the front and guide walls.

3. The cartridge as claimed in claim 2, wherein the slide shutter is in the form of a generally rectangular plate including a rectangular shutter body for selectively opening and closing the access opening and an lateral extension formed integrally with the rectangular shutter body so as to extend from one of opposite ends of the shutter body that is adjacent the opened position of the slide shutter, said rectangular plate having one corner area depleted to define a cutout at a location above the lateral extension for accommodating the twin coils of the torsional spring when the slide shutter is moved to the opened position to thereby avoid interference with the coils of the torsional spring.

4. The cartridge as claimed in claim 2 or 3, wherein said portion of the housing has a first slot defined therein for receiving the free end of the second spring arm and said slide shutter has a second slot defined therein for receiving the free end of the first spring arm, at least one of said first and second slots extending in a direction generally perpendicular to a direction of movement of the slide shutter.

5. The cartridge as claimed in claim 1, wherein said recording medium is an information carrier disc having at lest one of its opposite surfaces adapted for information to be recorded thereon or read therefrom, said carrier disc being rotatably accommodated within the medium chamber, and wherein the housing includes first and second panels opposite to each other joined together by means of a peripheral wall with the medium chamber defined therebetween and said access opening is defined in at least the first panel.

6. The cartridge as claimed in claim 5, wherein said access opening is also defined in the second panel in alignment with the access opening in the first panel;

wherein said slide shutter is of a generally U-shaped configuration including first and second shutter areas and a connecting wall connecting the first and second shutter areas together, said slide shutter being mounted exteriorly on the housing for sliding movement between the opened and closed positions with the first and second shutter areas lying parallel to the first and second panels of the housing, said access openings being closed respectively by the first and second shutter areas when the slide shutter is in the closed position, but opened when the slide shutter is in the opened position; and wherein the connecting wall of the slide shutter has a spring catch formed integrally therewith so as to protrude inwardly of the housing and the free end of the first spring arm is connected with said spring catch in the connecting wall, whereas the free end of the second spring arm is connected to one of corner areas of the housing adjacent the opened position of the slide shutter.

7. The cartridge as claimed in claim 6, wherein the twin-coiled torsional spring is accommodated within a void space at said one of the corner areas of the housing with the first and second spring arms extending generally parallel to any one of the first and second panels and towards a portion of the peripheral wall of the housing over which the slide shutter straddles, whereby the first and second spring arms are brought close to each other when the slide shutter is moved to the closed position, but are resiliently separated away from each other when the slide shutter is moved to the opened position, said coils when the slide shutter is in the closed position being positioned in abutment with another portion of the peripheral wall of the housing which lies substantially perpendicular to said first-mentioned portion of the peripheral wall of the housing.

* * * * *